United States Patent
Dressler, Jr.

[15] 3,638,856
[45] Feb. 1, 1972

[54] WHEEL SLIP DETECTOR HAVING FLUID LOGIC DEVICES

[72] Inventor: Edward T. Dressler, Jr., Mars Estates, Md.

[73] Assignee: Westinghouse Air Brake Company, Wilmerding, Pa.

[22] Filed: Dec. 30, 1969

[21] Appl. No.: 889,129

[52] U.S. Cl. ........................................................235/201
[51] Int. Cl. ..........................................................G06m 3/02
[58] Field of Search ..........................235/200, 201; 137/81.5

[56] References Cited

UNITED STATES PATENTS

| | | | |
|---|---|---|---|
| 3,199,782 | 8/1965 | Shinn | 235/201 |
| 3,228,602 | 1/1966 | Boothe | 235/201 |
| 3,342,197 | 9/1967 | Phillips | 235/201 |
| 3,352,267 | 11/1967 | Brandriff et al. | 235/201 X |
| 3,495,776 | 2/1970 | O'Neill | 235/201 |
| 3,503,423 | 3/1970 | Edell | 235/201 X |

Primary Examiner—Richard B. Wilkinson
Assistant Examiner—Lawrence R. Franklin
Attorney—Ralph W. McIntire, Jr.

[57] ABSTRACT

A fluidic wheel slip detector circuit for monitoring the synchronization or relative frequency of rotation of wheel/axle units of a railway vehicle by comparing the relative condition of a pair of fluidic binary counters driven in accordance with the rotational speed of the wheel/axle unit with which each counter is associated. Fluidic digital decoding circuitry is provided to continuously sense and indicate the progression of the counters. Fluidic decision logic circuitry including comparator means responds to a predetermined signal from the decoding circuitry for comparing the progression of the respective counters associated with each wheel/axle unit and controls fluidic memory means which produces an indication of which wheel/axle unit is rotating at the higher frequency in the absence of synchronization therebetween and maintains the signal until synchronization is restored. The decision logic circuitry also includes fluidic reset means responsive to another predetermined signal from the decoding circuitry to assure that the counters are reset in phase each cycle when either one of the counters first reaches a predetermined count.

4 Claims, 2 Drawing Figures

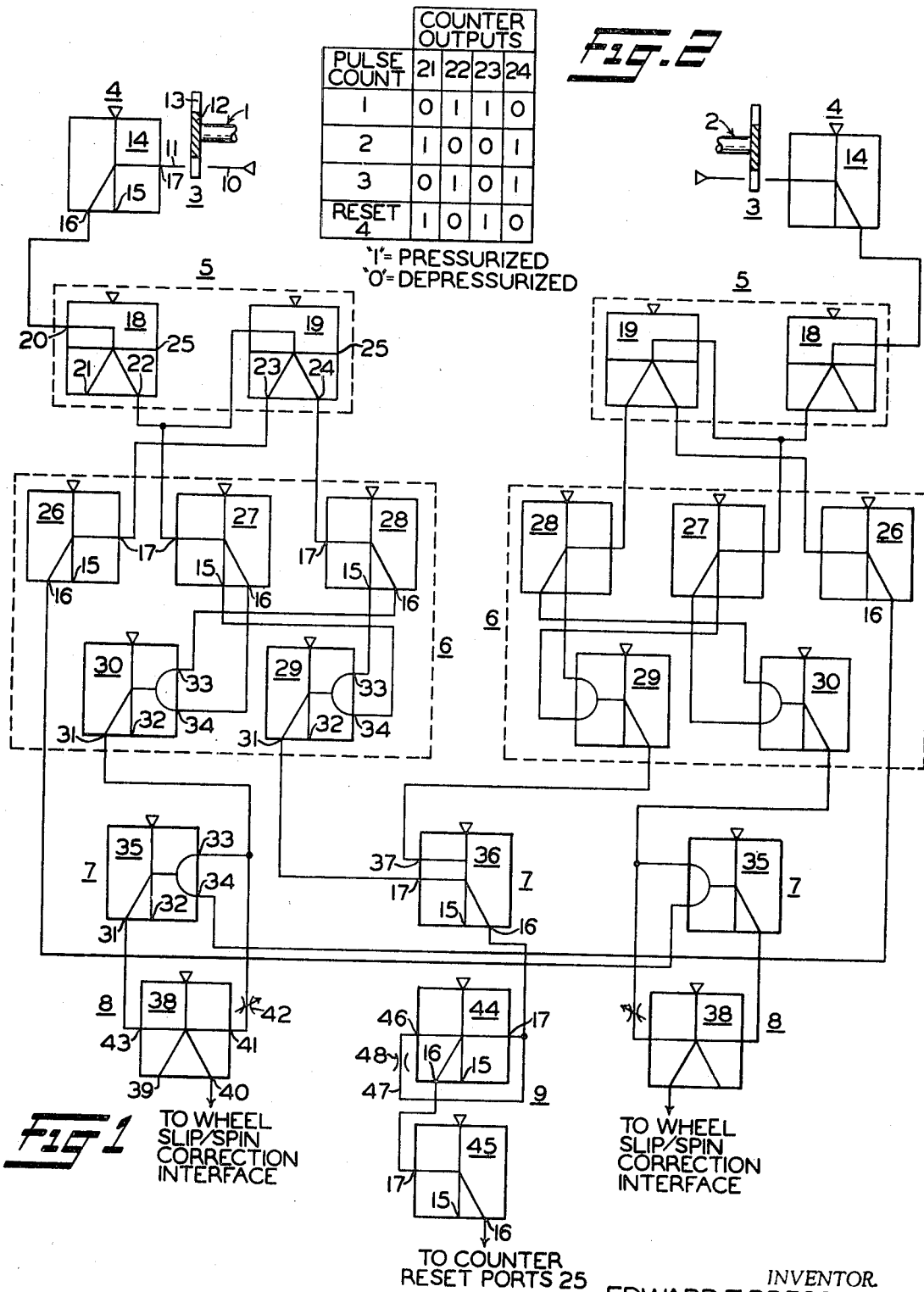

WHEEL SLIP DETECTOR HAVING FLUID LOGIC DEVICES

BACKGROUND OF INVENTION

The necessity for vehicle-borne wheel slip detection and correction apparatus is generally recognized as fundamental in bringing modern high-speed trains to a stop safely and without extreme train action. Occasions of abnormal conditions of wheel rotation arising are greatly increased with the higher rates of retardation employed in high-speed service, especially where the brake control system does not compensate for the peaking of brake forces near the end of a stop as the coefficient of friction increases incident to decreasing wheel speed. This wheel slip problem becomes even more critical in rapid mass transit service where maximum utilization of facilities is sought in attempting to maintain minimum train headways as well as high average speeds. Train operating schedules must be maintained under adverse rail conditions rather than being dictated by such conditions.

As opposed to normal conditions of wheel rotation, the term wheel slip, as here used, refers to the abnormal condition of a wheel that is rotating but at a speed below that corresponding to the speed of the vehicle, that is, below the speed of the wheels which are not slipping. This wheel slip condition is known as the incipient stage of wheel slide which, as here used, refers to the abnormal condition where the wheel is locked without rotation. Each of these conditions occurs in the braking mode of control. Wheel spin is the term applied to the wheel slip condition as it occurs in propulsion mode of control. In any case, the cause of the wheel slip, slide or spin condition results from either the brake forces or motor torque on the wheel exceeding the instantaneous value of the coefficient of friction between the wheels and rail.

Wheel slip is objectionable in that the retarding force produced under such condition is considerably less than when the wheel is rolling at normal speed. Wheel slide is objectionable not only because of reduced retardation but because of rough train action, wheel damage due to flat spots worn on the wheel treads as the wheel is dragged along the rail, and a generally unsafe operating condition. Wheel spin is objectionable in that loss of tractive effort is unavoidable.

Many different forms of wheel slip detection systems have been devised and, whether electrical or mechanical in nature, generally fall into either of two basic categories. In one category, measurement of the deceleration of an individual wheel and axle unit is made to detect a rate of change of its rotational speed in excess of a preselected rate such as is expected to cause a slipping condition to occur. Into the other category fall so-called comparison systems which function by sensing a difference in the rotational speed of separate wheel/axle units or between the wheel/axle units and some reference element to recognize a slip condition. While such devices have become progressively smaller and compact in size, they have also become more complex and consequently less reliable, command a high initial cost and are expensive to maintain.

SUMMARY OF INVENTION

It is the object of the present invention to provide a digital wheel slip detector device in which comparison of the rotational velocity of individual wheel/axle units is accomplished to detect a difference therebetween and to produce a signal indicative of which one of the compared wheel/axle units is rotating at the higher speed so that corrective action may be taken accordingly.

It is an extension of the above object to provide a wheel slip sensor device which is comprised of pure fluid logic and control elements to take advantage of their inherent reliability, long maintenance-free service life, simplicity, compactness and relative low cost.

According to the present invention, there is provided a wheel slip detector circuit comprising a pulse generator of the interruptable jet type mounted on each of two separate wheel/axle units, the rotating frequency of which is to be compared, a two-stage pure fluid binary counter associated with each wheel/axle unit and driven by the square wave pulses produced by the pulse generator, a digital logic decoding network of pure fluid components associated with each counter for sensing the progression of the counter, digital logic decision circuitry including pure fluid comparator means responsive to a preselected signal from the counter decoding network for comparing the state of the respective counters and pure fluid reset circuit means adapted to initiate a short duration pulse signal in response to another predetermined signal from the decoding network to assure that the counters are recycled in phase. Pure fluid memory means responsive to the comparator means associated with each wheel/axle unit being monitored provides an output signal indicating that the wheel/axle units are either rotating in synchronization, with an allowable deviation, or that the wheel/axle units are rotating out of synchronization. The memory means that provides the "out of synchronization" signal also indicates that the wheel/axle unit associated with that particular memory element is rotating at the higher speed.

The above-stated objects as well as other objects and advantages of the invention will become apparent from the following description when taken with the drawing, in which:

FIG. 1 is a schematic illustration of a wheel slip detector circuit showing my invention; and FIG. 2 is a truth table showing the condition of pressurization of the counter outputs for successive input pulses.

Referring now to the drawings, the wheel slip detector device comprises duplicate circuits associated with wheel/axle units 1 and 2 which may be units of the same truck or of different trucks of a railway vehicle. Each circuit comprises a pulse generator 3, fluidic means 4 for reinforcing the square wave fluid pressure pulses produced by the pulse generator, a fluidic binary counter 5 for producing a plurality of outputs which, in binary code, correspond to the number of input pulses registered by the counter, a fluidic logic decoding network 6 for interpreting the binary code provided by the plurality of counter outputs, decision logic circuitry 7 responsive to the decoding network for comparing the state of the counters when either one of the counters reaches a predetermined count and for initiating a counter reset signal when either one of the counters reaches another predetermined count to recycle the counters in phase, a memory control element 8 for providing and maintaining a signal indicating the relative state of the counters in accordance with the relative frequency of rotation of the wheel/axle units, and a "one-shot" multivibrator signal conditioning circuit 9 for limiting the duration of the counter reset signal.

The aforementioned pulse generators 3 operate to form square wave pressure pulses having a frequency which varies as a direct function of the rotational speed of the respective wheel/axle units 1, 2 and comprise an emitter tube 10 connected to a source of regulated fluid pressure, a collector tube 11 axially spaced from the emitter tube, and an interrupter vane 12 coaxially disposed on or otherwise responsive to the axles of wheel/axle units 1 and 2 which are to be monitored. The vane 12 includes a plurality of radially extending openings or notches 13 of equal size and spaced uniformly about the vane so that upon axle rotation, fluid pressure communication between the emitter tube 10 and collector tube 11 is periodically interrupted to produce at the collector a square wave signal having a frequency varying with the speed of axle rotation.

The aforementioned wave squaring devices 4 are provided to reinforce or resquare the wave shape at the output of the collector of each circuit, such reinforcement being provided in the event the location of the fluidic package, herein described and comprised of components 4, 5, 6, 7, 8 and 9, is so remote from the pulse generator portion of the sensor device that degradation of the generated pulses would normally occur due to passage of the pressure pulses through a long collector tube. The wave squaring circuit 4, which in effect is an amplifying stage, reproduces a square wave fluid pressure signal proportional to that at the collector input and comprises a pure fluid OR/NOR-gate 14 having a supply input to which a low fluid pressure is connected, a NOR-output 15, an OR-output 16, and a control input 17 to which the collector tube 11 is connected. Being conventional in operation as well as in design, pressurization of control input 17 results in the power stream through the device being switched from the preferred NOR-output 15 into the OR-output 16 and when depressurized will allow the power stream to switch from the OR output back to the preferred NOR output.

The aforementioned binary counters 5 are each comprised of two stages 18 and 19 indicated diagrammatically as representing counter 5. Although not shown in detail, one common example of such a counter circuit could, for example, include a basic configuration in which a fluidic differentiator or "one-shot" circuit is provided to detect a positive-going pulse at a control input indicated by reference numeral 20. A flip-flop circuit fabricated from two fluidic flip-flop elements interconnected in a back-to-back configuration is triggered from the differentiator to produce an output signal. Cascading the circuits comprising each stage by connecting the output of the previous or first stage to the differentiator input 20 of the next or second stage produces what is typically known as a binary counter, being fluidic in nature in the attendant scheme. Combinations of pressure state signals at outputs 21, 22 of the first stage 18 and outputs 23, 24 of the second stage 19 produce, in binary code, an indication of the number of impulses presented at the input 20 of the first stage of the counter up to a maximum of four, after which the counter will automatically recycle to continuously repeat the count sequence as long as fluid supply pressure is provided to maintain the operative condition of the fluidic elements comprising the counter. A port 25 at each stage is provided to allow the counter to be set to any stage desired. When each port 25 is pressurized, each stage is set to its initial condition, thereby resetting the counter.

The aforementioned decoding networks 6 each include three pure fluid OR/NOR-devices 26, 27 and 28, as well as AND/NAN:-devices 29 and 30. The OR/NOR-devices 26, 27 and 28 are connected so as to duplicate at their outputs the pressure state signals effective at the outputs of counter stages 18, 19 of each counter and to increase the number of output signals available without loss of signal pressure. OR/NOR-devices 26, 27 and 28 are identical to previously described OR/NOR-device 14 and therefore require no further description except to point out that corresponding reference numerals are utilized. The power stream of OR/NOR-device 27 is deflected from the preferred NOR-output 15, in which it is stable in the absence of a pressure signal at control input 17, into OR-output 16 when control input 17 is pressurized consequent to pressurization of the counter first stage output 22 to which control input 17 is connected. Likewise, the power stream of gate 28 is deflected from the preferred NOR-output 15, in which it is stable in the absence of a pressure signal at control input 17, into OR-output 16 when control input 17 is pressurized consequent to pressurization of the counter second stage output 24 to which control input 17 is connected.

The aforementioned AND/NAND-devices 29 and 30 are adapted to receive the reinforced counter pressure state signals by way of OR/NOR-devices 27 and 28 so as to combine with OR/NOR-device 26 for interpreting the counter outputs to ascertain or sense the progression of counter impulses and thus produce the required outputs at appropriate times in accordance with the impulse count. Each AND/NAND-device 29, 30 includes a supply port to which a low fluid pressure source is connected, an AND-output 31, a NAND-output 32, and a pair of control inputs 33, 34 connected to the appropriate outputs of the OR/NOR-devices 29, 30. Being conventional in operation, the power stream through the device is deflected from the NAND-leg 32 in which it is stable in the absence of pressurization of either one or both control inputs 33, 34 into AND-output 31 when control inputs 33 and 34 are both pressurized.

The control input 33 of AND/NAND-device 29 is connected to the NOR-output 15 of OR/NOR-device 28, while control input 34 of AND/NAND-device 29 is connected to the NOR-output 15 of OR/NOR-device 27. Since the pressure state signals at the outputs of gates 27 and 28 are determined by the state of the respective counters, it will be seen that gate 29 is enabled to pressurize its connected output 31 whenever the counter reaches a predetermined count consequent to pressurization of outputs 15 of devices 27 and 28.

As compared to gate 29, control inputs 33, 34 of AND/NAND-device 30 are connected to the opposite or compliment outputs 16 of OR/NOR-devices 27 and 28, respectively, to thereby enable device 30 to pressurize its connected AND-output 31 at a different predetermined count as reflected by the counter binary code that is the compliment of that which enables AND/NAND-device 29. The outputs 31 of devices 29 and 30 are thus pressurized at different impulse counts of the counter, as will hereinafter be explained, being depressurized during all other counts.

The aforementioned decision logic circuits 7 each include a pure fluid AND/NAND-device 35 identical with AND/NAND-devices 29 and 30, and a two-input pure fluid OR/NOR-device 36 identical with OR/NOR-devices 26, 27 and 28 except that an additional control port 37 is utilized. Since these devices are identical or similar to previously described devices, no further description is believed necessary except to point out that like reference numerals are applied to corresponding identities.

Connected to output 31 of AND/NAND-device 30 associated with the circuit of each wheel/axle unit 1 and 2 is the control input 33 of each AND/NAND-device 35. Control input 34 of device 35 associated with the circuit of wheel/axle unit 1 is connected to OR-output 16 of OR/NOR-device 26 associated with the circuit of wheel/axle unit 2; conversely, control input 34 of device 35 associated with wheel/axle unit 2 is connected to OR-output 16 of OR/NOR-device 26 associated with the circuit of wheel/axle unit 1.

Since control inputs 33 and 34 of AND/NAND-devices 35 are derived in accordance with output signals from the decoding networks 6 occurring in different states of the counters, it will be apparent that the presence of both inputs 33 and 34, which results in output 31 being pressurized, produces an indication that the counters have progressed out of unison due to a deviation existing between the rotating frequency of the respective wheel/axle units.

Connected to output 31 of device 29 associated with wheel/axle unit 1 is control input 17 of two-input OR/NOR-device 36 while input 37 thereof is connected to output 31 of device 29 associated with the circuit of wheel/axle unit 2. Since output 16 of OR/NOR-device 36 is pressurized in response to pressurization of either control input 17 or 37, it will be apparent that device 36 is enabled in accordance with whichever device 29 associated with either wheel/axle unit 1 or 2 is first enabled to initiate a counter reset signal.

Memory control elements 8 are subject to the AND/NAND-devices 35 of the respective wheel/axle unit decision networks 7, being comprised of a pure fluid bistable flip-flop device 38. Being conventional in design, each flip-flop 38 comprises a supply input to which low fluid pressure is connected, a pair of outputs 39, 40, a control input 41 connected by way of an adjustable pressure restrictor 42 to output 31 of OR/NOR-device 30, and an opposing control input 43 connected to output 31 of AND/NAND-device 35, said connections being made with devices 30 and 35 of the same wheel/axle unit circuit. Pressurization of either output 39 or 40 occurs in accordance with whichever one of the control inputs 41 or 43, respectively, is provided with a preponderance of fluid pressure over the other, which pressurized output remains in a pressurized condition, even should both inputs be subsequently depressurized, until the other input is provided with a preponderance of pressure to cause the power stream to switch outputs accordingly.

The aforementioned signal conditioning circuit 9 comprises a pure fluid OR/NOR-device 44 arranged to provide a "one-shot" multivibrator or differentiator circuit and a pure fluid OR/NOR-device 45 used as a signal amplifying stage. Pure fluid OR/NOR-device 44 includes outputs 15 and 16 into which the power stream is directed in accordance with pressurization of opposing control inputs 17 and/or 46. An RC timing circuit comprising the capacitance of a conduit 47 tapped from control input 17 and connected to control input 46 by way of a fluid flow restrictor 48 causes the power stream to revert to its preferred output 15 a predetermined time after a positive-going pulse is sensed at control input 17 to thereby limit the duration of the pressure signal at connected output 16 irrespective of the duration the pressure signal is present at control input 17. In the absence of a pressure signal at control input 17, the power stream will pressurize its preferred output 15. Consequently, the connected output 16 is pressurized for only a short duration, as determined by the values of the RC circuit comprising conduit 47 and restrictor 48, each time OR/NOR-device 44 is enabled.

Pure fluid OR/NOR-device 45 is conventional in design, having outputs 15 and 16, and control input 17, the pressure state of which determines which output is pressurized by the power stream. Control input 17 of device 45 is connected to output 16 of gate 44 to deflect the power stream from its preferred output 15 to output 16 when device 44 is enabled, the purpose being to reinforce the short-duration pulse produced by the differentiator device 44 so as to provide sufficient driving force or fluid pressure momentum to positively reset each counter. Output 16 is connected to the reset ports 25 of each counter stage, thus simultaneously resetting each counter so as to assure the start of their count sequence in phase each cycle.

In now describing the operation of the wheel slip detector circuit, let it be assumed that the wheel/axle units 1 and 2 being monitored are rotating at speeds corresponding to the linear speed of a railway vehicle. Since under actual service conditions it is unlikely that a corresponding rate of wheel slip or spin of both wheel/axle units would occur simultaneously, it can be reasonably assumed therefore that as long as the wheel/axle units are rotating at corresponding speeds, no wheel slip or spin condition exists. In cases where the wheel and axle units may each be locked in a slide condition such that corresponding rates of rotation (zero speed) would normally be incorrectly monitored as an acceptable state, the condition can be correctly detected as an unacceptable state by additional logic sensing circuitry, which is not shown nor intended to be disclosed as a part of the present invention. Additional supplemental circuitry, also not shown, would normally be provided to sense the propulsion or braking mode of control as a means of differentiating between a wheel spin and a wheel slip condition respectively.

Since interrupter vane 12 is adapted to rotate with the respective wheel/axle unit to which it is mounted so as to bisect the gap between the emitter tube 10 and collector tube 11, its notched configuration produced by reason of openings 13 results in continuity of the jet stream from the emitter to the collector being alternately interrupted at a frequency corresponding to the rotating speed of the respective wheel/axle unit, thereby providing at collector 11 and control input 17 of each OR/NOR-device 14 associated with wheel/axle units 1 and 2 a square wave signal comprised of a series of fluid pressure pulses having a frequency dependent upon the rotational speed of the respective wheel/axle unit.

In response to each positive-going pulse at control input 17, the power stream of device 14 is switched from output 15 to output 16, and at the termination of the input pulse, automatically returns to its preferred output 15, thus reproducing at the connected output 16 an amplified duplication of the square wave signal originating at the collector 11.

The conditioned pulse train thus produced at the connected OR-output 16 of each device 14 varies in frequency with the rate of rotation of the respective wheel/axle units. This variable frequency signal is fed to the first stage input 20 of the respective counters 5 associated with each wheel/axle unit. Having two stages 18 and 19, each binary counter 5 is capable of producing a combination of pressure state signals at its outputs which reflects the number of input pulses, as a binary code, up to a maximum of four. As is well known, an inherent characteristic of such counters is their ability to automatically recycle and repeat the binary count sequence, as long as the input pulses are forthcoming.

Assuming that the respective counters have been reset to their initial state by reason of reset signal conditioning circuit 9 having simultaneously recycled the counters as will hereinafter be explained, outputs 21 and 23 of the respective counter stages 18 and 19 of each counter are pressurized and the compliment outputs 22 and 24 are depressurized. Being connected to the control input 17 of OR/NOR-device 26 associated with one wheel/axle unit circuit, pressurization of binary counter output 23 results in pressurization of OR/NOR-output 16 connected to control input 34 of AND/NAND-device 35 associated with the other wheel/axle unit. Since the wheel/axle units are assumed to be rotating at corresponding rates, each device 35 will see a signal at its one control input 34 but not at its second control input 33 for reasons which will hereinafter be apparent. Consequently AND/NAND-device 35 remains disabled with its connected output 31 being depressurized.

The first input pulse transmitted to and registered by either counter results in output 22 of the counter first stage becoming pressurized and output 21 consequently becoming depressurized with no change of state occurring with respect to the outputs of the second counter stage. By reason of pressurized counter output 22 being connected to the control input 17, of OR/NOR-device 27, output 16 thereof is consequently pressurized to present a signal at the one control input 34 of AND/NAND-device 30. Since control input 33 of AND/NAND-device 30 is depressurized due to the state of the counter at this point in time, AND/NAND-device 30 remains disabled with its connected output 31 being depressurized. Thus, it now becomes apparent that until device 30 is enabled to pressurize its output 31, control input 33 of device 35 remains in its preferred state in which its output 31 is depressurized. As long as each device 35 associated with the respective wheel/axle units remains disabled, the wheel/axle units are considered to be in synchronization which is an acceptable condition in which no wheel slip control action is called for.

The second registered input pulse at each counter results in the first stage output 22 becoming depressurized and the second stage output 24 becoming pressurized with its compliment output 23 consequently being depressurized. This results in OR/NOR-devices 26 becoming disabled to depressurize the control inputs 34 of the respective AND/NAND-devices 35 which are now rendered disabled as long as counter outputs 23 remain depressurized. At the same time, output 16 of each OR/NOR-device 27 is depressurized with preferred output 15 consequently becoming pressurized due to the loss of pressure signal from counter outputs 2. This removes the pressure signal from input 34 of each device 30 and applies a control signal at input 34 of devices 29. However, pressurization of each counter output 24 results in output 16 of devices 28 being pressurized and output 15 consequently becoming depressurized. This results in a control signal being applied at the input 33 of devices 30 and removal of the control signal at input 33 of devices 29. It is apparent therefore that the state of the control inputs of AND/NAND-devices 29 and 30 is simply reversed from the previous state of the counter and since neither devices 29 nor 30 of the respective wheel/axle units is presented with pressure signals at both control ports 33 and 34, each remains disabled to withhold triggering either two-input OR/NOR-device 36 or AND/NAND-devices 35 of decision networks 7.

In any event each device 35 is presented from being enabled due to devices 26 being disabled, as above explained, in this state of the counter.

The third registered input pulse at the counters results in their first stage output 22 again becoming pressurized with the second stage output conditions remaining unchanged. In response to each counter output 22 becoming pressurized, output 16 of each device 27 is consequently pressurized to present a control signal at input 34 of devices 30. This signal, combined with the signal already present at input 33, results in AND/NAND-devices 30 being enabled. Accordingly, control input 33 of AND/NAND-device 35 finally becomes pressurized, as does control input 41 of flip-flop 38. Since wheel-axle units 1 and 2 are assumed to be rotating at substantially corresponding rates, indicating that no wheel slip or spin exists, it will be apparent that control input 34 of each device 35 associated with the respective wheel/axle units will be absent due to devices 26 remaining disabled by reason of each counter having progressed substantially simultaneously to the third pulse count. Therefore, the power stream through gate 35 pressurizes output 32 while output 31 and consequently control input 43 of flip-flop device 38 is depressurized. The power stream through devices 38 is thus forced by the control signal effective at input 41 to pressurize output 39 so that output 40 thereof is consequently depressurized. Since devices 26 are disabled in response to a two count as well as a three count whereby the control inputs 34 of the comparison devices 35 are depressurized, it is apparent that the time between the second and third counts constitutes an acceptable elapsed time duration during which the counters and thus the wheel/axle units are considered to be synchronized. In other words, if one counter has progressed to at least a count of two by the time the other counter has reached the comparison state at the count of three, no wheel slip protection control is requested as indicated by the absence of a pressure state signal at output 40 of each flip-flop 38. This tolerable deviation in the rotating frequency of the wheel/axle units it intended to take into account the fact that the pulse generators may drive the counters slightly out of phase and to also allow incipient high-speed wheel slip, which is a normal accompaniment of high-speed travel, time to correct itself before any wheel slip protection control is imposed.

If, however, one of the counters has not yet registered two input pulses by the time the other counter registers three, then a definite discrepancy is indicated in the rotating frequency of the wheel/axle units 1 and 2 being monitored. For example, if wheel/axle unit 1 is rotating at a faster rate than wheel/axle unit 2 so that the counter associated with unit 1 counts three before the counter associated with wheel/axle unit 2 reaches a count of two, subject to the counter associated with wheel/axle unit 2, then device 26 will be enabled by pressurization of its control input 17 from output 23 of the second counter stage. Consequently, control input 34 of device 35 associated with wheel/axle unit 1 is pressurized. When counter 5 associated with wheel/axle unit 1 reaches a count of three, as previously explained, control input 33 of device 35 is also pressurized, resulting in AND/NAND-device 35 being enabled. The power stream through the device is thus deflected into output 31 connected to control input 43 of flip-flop device 38. Due to the presence of restrictor 42 in the line feeding control input 41, the preponderance of pressure between control inputs 41 and 43 is such that the power stream is switched from output 39 in which it was previously biased to output 40, thus providing a signal indicating that wheel/axle unit 1 is rotating faster than wheel/axle unit 2 due either to unit 1 spinning or unit 2 slipping or sliding. Ancillary interface devices as required may be employed to sense the mode of operation to detect the slip or slide condition and to initiate the necessary control to alleviate the discrepancy.

At the fourth registered pulse, the respective counter 5 produces a pressure signal at the outputs 21 and 23 of first and second stages 18 and 19, respectively. Since output 22 of counter stage 18 is accordingly depressurized, control input 17 of device 27 is depressurized whereby its power stream is switched into output 15 to pressurize control input 34 of device 29. At the same time, pressurization of output 24 of counter stage 19 is accompanied by depressurization of output 24. Accordingly, depressurization of control input 17 of device 28 results, allowing its power stream to return to its preferred output 15 to pressurize control input 33 of its associated gate 29. With both control inputs 33 and 34 of AND/NAND-device 29 both pressurized, AND/NAND-device 29 is enabled to pressurize its connected output 31. Consequently, one or the other of the control inputs 17 or 37 of OR/NOR-device 36 is pressurized depending upon which wheel/axle unit 1 or 2 has caused its respective counter to first progress to a count of four. Should the counters advance to count 4 in phase, signals at inputs 17 and 37 will occur substantially simultaneously. In either event, pressurization of output 16 of device 36 will occur, resulting in pressurization of control input 17 of device 44 comprising a differentiator circuit. The power stream issuing from preferred output 15 is switched into output 16 which remains pressurized until an opposing control signal arises at control input 48 by way of an RC network comprising the volume of tubing 47 and restrictor 48. After a short duration delay imposed by the RC network, the power stream is switched back to its preferred output 15, thus resulting in depressurization of output 16. Control input 17 of OR/NOR-device 45 is accordingly pressurized by the short duration pulse produced at output 16 of device 44 to enable device 45 to reproduce the control signal by way of a short duration pulse at its output 16. This amplified signal is fed to reset ports 25 at each stage of counters 5 with sufficient force to assure that both counters are simultaneously set to their initial state to being the count process in phase each cycle. The necessity of the short duration pulse is to allow the reset signal to clear quickly in order to permit the counters to immediately register subsequently occurring input pulses after each reset function without undue delay.

After the reset function, both counters are set in their initial state in which outputs 21 and 23 are pressurized and outputs 22 and 24 are depressurized, as previously explained. Until the counters register the first input pulse after being reset, it will be apparent that in the initial or reset state in which each counter is set, no additional reset pulse can be produced, thus assuring that the counters are not locked up in a reset condition. The counters are thus able to proceed on an individual pulse count basis until one of the counters again reaches the reset count. If in the meantime, a wheel slip or spin condition had been detected, as indicated, for example, by output 40 of one or the other flip-flop 38 being pressurized as hereinbefore explained, the appropriate flip-flop device will, by memory, retain the output condition until the respective counter again reaches a count of three when the comparison function is accomplished by reason of input 33 being pressurized as hereinbefore explained. If at this time device 35 senses that the wheel slip or slide condition still exists by reason of device 26 associated with the opposing wheel/axle unit pressurizing input 34 to enable device 35 no change will occur with respect to flip-flop 38; however, if the discrepancy condition has been rectified such that device 35 is disabled, then the output of device 30, enabled in count 3 and acting by way of restrictor 42, will pressurize control input 41 of flip-flop device 38 sufficiently to switch the power stream into output 39, since control input 43 is depressurized. Thus, output 40 is depressurized and the wheel slip or slide signal is removed.

The fluidic circuitry associated with wheel/axle unit 2 is identical to that associated with wheel/axle unit 1, and produces an indication that wheel/axle unit 2 is either rotating at a faster rate than wheel/axle unit 1, thus indicating that a spin condition exists with respect to wheel/axle unit 2 or that a slip or slide condition exists with respect to wheel/axle unit 1. In the absence of a pressure signal at the connected output 40 at either of the flip-flops 38, the wheel/axle units are considered to be rotating in synchronization.

Having now described the invention, what I claim as new and desire to secure by Letters Patent, is:

1. A system for indicating a difference in the rate of rotation of either one of a pair of rotatable members relative to the other, each member having associated therewith apparatus comprising:
  a. a pulse generator for producing a train of pulses varying in frequency according to the rate of rotation of a different one of said members,
  b. a binary counter responsive to said train of pulses for sequential advancement to different ones of a plurality of stages,
  c. a logic circuit including:
    i. an OR gate having an output for providing a first signal in response to said counter being in a first stage of advancement,
    ii. a first AND gate having an output for providing a second signal in response to said counter being in a third stage of advancement, and
  d. a comparator AND gate having a pair of inputs, one of which is connected to the output of said OR gate in said logic circuit associated with said one of said members and the other of which is connected to the output of said first AND gate in said logic circuit associated with the other one of said members, and an output for providing an error signal when said first and second signals from the logic circuits associated with said one and said other member respectively are concurrently effective, in accordance with said one member rotating at a predetermined lower rate than said other member.

2. The system as recited in claim 1, wherein said apparatus associated with each member further comprises a bistable flip-flop element having opposing inputs connected respectively to the outputs of said comparator AND gate and said first AND gate associated with a corresponding one of said members and an output providing a memory signal in response to said error signal, said memory signal at said flip-flop being removed in response to said second signal being provided thereat in the absence of said error signal.

3. The system as recited in claim 2, further characterized in that means is provided for reducing the level of said second signal at one of said opposing inputs of said flip-flop so that when said error signal is concurrently effective at the other one of said opposing inputs, said memory signal is provided.

4. The system as recited in claim 1 wherein said system further comprises:
  a. said logic circuits each including a second AND gate having an output for providing a third signal in response to said counter being in a fourth stage of advancement,
  b. OR gate means subject to said third signal provided by said second AND gate of either one of said logic circuits for providing a reset signal, and
  c. said counters having reset port means subject to said reset signal for simultaneously resetting each of said counters from any stage of advancement to said first stage.

* * * * *